(12) United States Patent
Takei et al.

(10) Patent No.: US 6,337,155 B1
(45) Date of Patent: Jan. 8, 2002

(54) BATTERY AND METHOD OF MANUFACTURE THEREOF

(75) Inventors: Fumio Takei; Hiroaki Yoshida, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/374,997

(22) Filed: Aug. 16, 1999

(30) Foreign Application Priority Data

Dec. 17, 1998 (JP) .......................................... 10-359231

(51) Int. Cl.$^7$ ................................................ H01M 4/62
(52) U.S. Cl. ....................... 429/212; 429/232; 29/623.5
(58) Field of Search ................................ 429/212, 213, 429/232; 205/58; 29/623.5

(56) References Cited

U.S. PATENT DOCUMENTS

| 4,321,114 A | * | 3/1982 | MacDiarmid et al. | ......... | 205/58 |
| 5,151,162 A | * | 9/1992 | Müller et al. | ............ | 429/213 X |
| 5,437,943 A | * | 8/1995 | Fujii et al. | ............... | 429/213 X |
| 5,451,476 A | * | 9/1995 | Josefowicz | ................. | 429/213 |
| 6,159,635 A | * | 12/2000 | Dasgupta et al. | ........ | 429/232 X |

FOREIGN PATENT DOCUMENTS

| JP | 6-271655 | 9/1994 |
| JP | 8-236156 | 9/1996 |
| JP | 10-27615 | 1/1998 |

* cited by examiner

*Primary Examiner*—Stephen Kalafut
(74) *Attorney, Agent, or Firm*—Armstrong, Westerman, Hattori, McLeland & Naughton LLP

(57) ABSTRACT

A secondary battery using a metal oxide enabling intercalation of alkali metal ion, as an active material for cathode, and a polymeric solid electrolyte as an electrolyte, and a method of the manufacture thereof are disclosed. The battery comprises an assembly of a cathode consisting mainly of a metal oxide enabling intercalation of an alkali metal ion and a electrically conductive material, a cathode collector in contact with the cathode, an anode of a material selected from the group consisting of an alkali metal, an alloy of an alkali metal and a metal of group II or III, and a carbon material capable of occluding alkali metal ion, an anode collector in contact with the anode, and a polymeric solid electrolyte interposed between the anode and the cathode, and an external packaging material sealing the assembly, wherein the electrically conductive material for the cathode is an electrically conductive polymer formed by polymerizing a monomer on the surface of particle of the metal oxide constituting the cathode in a solution in which the monomer is dissolved.

20 Claims, 1 Drawing Sheet

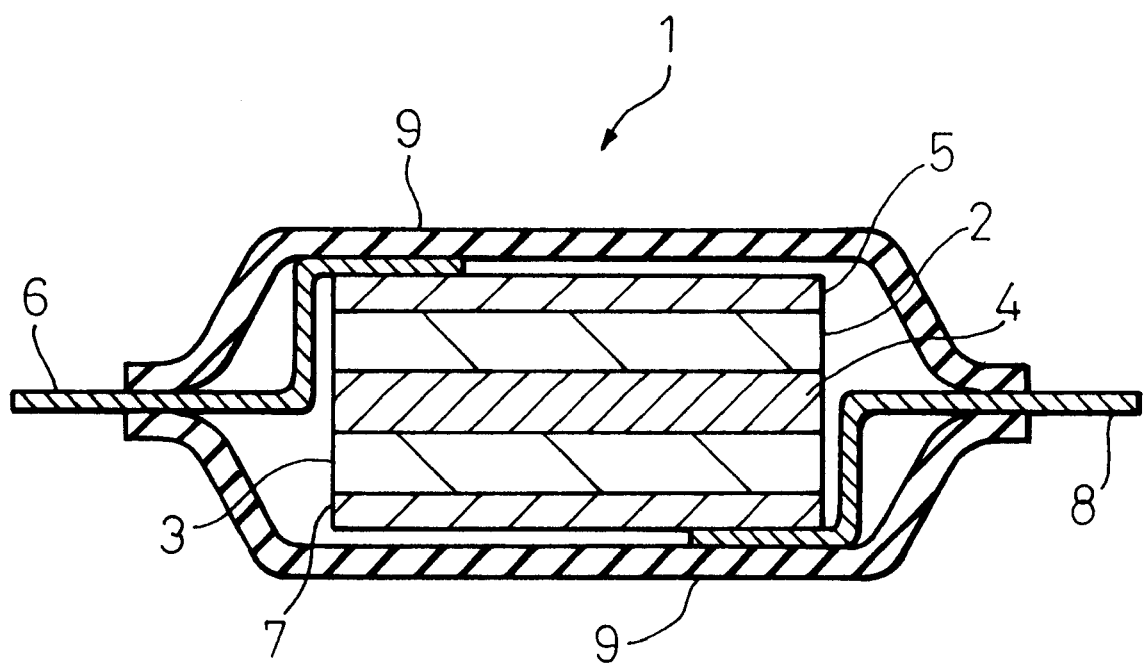

BATTERY AND METHOD OF MANUFACTURE THEREOF

BACKGROUND OF THE INVENTION

1. Field of the Invention

The invention relates to a battery using a metal oxide enabling intercalation of alkali metal ion, as an active material for cathode, and a polymeric solid electrolyte as an electrolyte, the battery having improved discharge rate properties and stability at an elevated temperature.

2. Description of the Related Art

Recently, highly integrated and highly functional devices represented by very large scale integrated circuits (VLSIs) have been realized to a remarkable progress in microelectronics, especially techniques for the manufacture of semiconductor functional elements. By employing these devices for controlling systems in various pieces of equipment, rapid miniaturization of electrical equipment has been achieved, contributing to miniaturization and multi-functionalization of not only electrical equipment for various industries but also domestic electrical equipment.

Such electrical equipment is being directed toward cordless equipment which has an independent power supply device, and is operable while not relying on a commercial power supply. As a power supply, a battery is generally used, and among others, a so-called secondary cell which can be repeatedly charged for reuse is useful as a power supply for a portable information device such as a pocket telephone or hand-held personal computer because of the very low cost per one charge-discharge cycle. For the sake of miniaturization and lightening of the entire electronic equipment and operation for a longer time, development of a high performance battery having a smaller size and a higher capacity has been demanded.

As a battery suitable for miniaturization and lightening of the entire electronic equipment, attention has been paid to a so-called lithium secondary battery using a redox reaction of lithium ion. In recent years attention has been paid to a battery using, as an electrolyte which is an important component in a battery, a polymeric solid electrolyte. This is because the polymeric solid electrolyte has advantages in that it gives improved safety because of absence of problem of liquid leakage, which is a problem common to batteries using an electrolyte of solution type, and low flammability compared with prior solution-type batteries, and it makes it possible for the battery itself to have an improved processability and provide a battery having a thinner and freer shape because of excellent productibility of the polymeric solid electrolyte.

In a prior secondary battery using lithium, as set forth above, a system is used as a polymeric solid electrolyte, the system providing a larger ion electrical conductivity as a whole by adding an organic solvent having a higher polarization as an electrolyte component in a matrix of polymer material having a relatively high dielectric constant, such as polyethylene oxide, polyacrylonitrile, polyvinyl pyridine, polyvinyl chloride, polyvinyl alcohol, or a derivative obtained by introducing in the polymer material a reactive functional group such as acryloyl, vinyl or epoxy. This is because in a lithium secondary battery, the lithium ion as a carrier of electrical charge originates in a lithium salt such as lithium perchlorate, lithium tetrafluoroborate, lithium hexafluorophosphate, and lithium tetrafluorosulfonate, and the salt must sufficiently dissociate in an electrolyte, and the lithium ion must move in a sufficient rate to cancel polarization resulting from charging and discharging the battery.

As a solid electrolyte satisfying these conditions, a system can be used which is obtained by, for example, adding a non-aqueous organic solvent such as propylene carbonate to a polyethylene oxide, and further adding to the resultant mixture 1 to 3M of lithium hexafluorophosphate. Such a system has the advantage of providing a thin sheet-like battery, providing flexibility in the battery shape.

In the secondary battery system as referred to above, a powder of a metal oxide enabling intercalation of alkali metal ion, such as lithium cobaltate, lithium imanganate, or lithium nickelate, is used as the cathode. By contact with the cathode material of metal oxide, the polymeric solid electrolyte, as referred to above, becomes capable of transporting an alkali metal ion, resulting from charging and discharging, to the cathode.

The oxide materials used for a cathode have, in general, insulating properties. Accordingly, it is necessary that a redox current (electrons) resulting from alkali metal ions entering and leaving the cathode is transported to an external electrode in some way. Generally, a carbon-based conductive material having a high conductivity, such as acetylene black, is mixed with metal oxide powder for a cathode, to thereby lower the resistance of the cathode.

Contact of a metal oxide material with a carbon-based conductive material, which are both powdery or particulate, is point-contact, and relative location of the metal oxide material and carbon-based conductive material particles is changed while ions enter and leave the cathode. Consequently, an electrical resistance for transporting electrons from the cathode to the outside is apt to be spontaneously increased with the passage of time. Since the metal oxide particle has a surface of complicated configuration, it is not easy for, in particular, the carbon-based conductive material to come in contact with a deep site in the configuration. In addition, when a temperature of the battery is increased during the use thereof, an electrolyte component is expanded and changes in volume, to cause a change of location of the carbon-based conductive material in contact with the metal oxide and to cause the resistance to increase, so that there can be a case where discharge rate properties, particularly at an elevated temperature, are adversely affected.

Japanese Unexamined Patent Publication (Kokai) No. 8-236156 describes a battery having a cathode consisting of a conductive polymer or a transition metal oxide, or both. Only a polyaniline is used for the cathode in the examples, and no cathode using both of the conductive polymer and the transition metal oxide is shown.

Japanese Unexamined Patent Publication (Kokai) No. 6-271655 describes infiltrating a monomer forming a conductive polymer and a supporting electrolyte into an electrode of a porous body and forming a conductive polymer film on the entire surface inside the porous body electrode by electrolytic oxidation in the supporting electrolyte solution for the manufacture of an electrode used in a capacitor. However, this publication does not describe an electrode formed of metal oxide particles having, in part, on their surface, a polymer formed from a monomer.

Japanese Unexamined Patent Publication (Kokai) No. 10-27615 describes an electrode using a combination of a conductive polymer and a metal oxide, and indicates a polyaniline as the conductive polymer. In this reference, however, as is evident from metal oxide powder being added to a solution in which the polyaniline is dissolved in advance, the conductive polymer is not formed on the surface of the metal oxide powder, and is solvent-soluble.

SUMMARY OF THE INVENTION

It is an object of the invention to provide a battery which is excellent in discharge rate properties and high-temperature stability by use of an improved conductive material in contact with a metal oxide in a cathode.

The battery of the invention comprises an assembly of a cathode consisting mainly of a metal oxide enabling intercalation of an alkali metal ion and an electrically conductive material, a cathode collector in contact with the cathode, an anode of a material selected from the group consisting of an alkali metal, an alloy of an alkali metal and a metal of group II or III, and a carbon material capable of occluding alkali metal ion, an anode collector in contact with the anode, and a polymeric solid electrolyte interposed between the anode and the cathode, and an external packaging material sealing the assembly, wherein the electrically conductive material for the cathode is an electrically conductive polymer formed by polymerizing a monomer on the surface of particle of the metal oxide constituting the cathode.

The battery of the invention can be manufactured by a method of manufacturing a battery comprising preparing an assembly of a cathode consisting mainly of a metal oxide enabling intercalation of an alkali metal ion and an electrically conductive material, a cathode collector in contact with the cathode, an anode of a material selected from the group consisting of an alkali metal, an alloy of an alkali metal and a metal of group II or III, and a carbon material capable of occluding alkali metal ion, an anode collector in contact with the anode, and a polymeric solid electrolyte interposed between the anode and the cathode, and sealing the assembly by an external packaging material, the method comprising a step of making the electrically conductive material for the cathode by polymerizing a monomer on the surface of particle of the metal oxide constituting the cathode in a solution in which the monomer is dissolved.

BRIEF DESCRIPTION OF THE DRAWING

The above and other objects and advantages of the invention will be well understood and appreciated by a person with ordinary skill in the art, from consideration of the following detailed description made by referring to the attached drawing, wherein:

FIG. 1 is an illustration of an embodiment of the battery of the invention.

DETAILED DESCRIPTION OF THE INVENTION

In FIG. 1, the battery 1 of the invention comprises a cathode 2, an anode 3, a polymeric solid electrolyte 4, a cathode collector 5, a cathode lead 6 for connecting the cathode collector to an external electric circuit, an anode collector 7, an anode lead 8 for connecting the anode collector to the external electric circuit, and an external packaging material 9 made of, in general, a laminate material. The cathode lead 6 and the anode lead 8 may be formed by extending the cathode and anode collectors 5 and 7, respectively, or may be prepared from members different from the collectors as shown in the drawing.

In contrast with the prior art disclosed in Japanese Unexamined Patent Publication (Kokai) Nos. 8-236156, 6-271655, and 10-27615 as referred to above, the battery of the invention is characterized in that the conductive material for the cathode is formed by polymerizing a monomer on the surface of metal oxide particles constituting the cathode, the polymeric conductive material being an electrically conductive polymer which is insoluble in a solvent used in the battery, and the polymer being deposited on the surface of the metal oxide particle in such a manner that the polymer partially exposes the surface, as described in detail below.

Thus, the cathode in the battery of the invention consists mainly of a metal oxide and an electrically conductive material and, in other words, it is based on the metal oxide and the conductive material and may comprise other material or materials added as required. As the metal oxide as a base material for the cathode, a metal oxide enabling intercalation of alkali metal ions, such as a cobalt oxide, vanadium oxide, manganese oxide, or nickel oxide, can be used. Representatives of usable metal oxides include lithium cobaltate, lithium vanadate, lithium manganate, and lithium nickelate. Any mixture of these oxides may be used.

Another base material for the cathode, the electrically conductive material, is a conductive polymer material obtained by polymerizing a monomer for forming the conductive polymer on the surface of metal oxide particle by an oxidative action of the metal oxide. As the conductive polymer, a material such as polypyrrole, polyaniline, polythiophene, or polyfuran can be used, the respective corresponding monomers thereof being pyrrole, aniline, thiophene, and furan. Their derivatives may be used as a monomer for the conductive polymer. The conductive polymer may be a copolymer of two or more monomers.

More specifically, the conductive polymer in the cathode of the invention can be produced by adding powder particles of a metal oxide to a solution of a monomer for such a conductive polymer dissolved in water or an organic solvent which does not prevent a polymerization reaction, and oxidatively polymerizing the monomer to form the conductive polymer on the surface of the metal oxide by use of an oxidative action of the metal oxide. By way of example, when pyrrole is used as a monomer, it is polymerized to form a polypyrrole according to the following reaction mechanism:

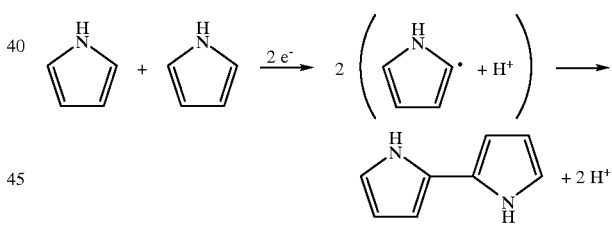

Addition of metal oxide particles to a solution of a monomer prior to the oxidative polymerization on the surface of the metal oxide particle leads to formation of a thin film layer on the metal oxide particle surface, because the monomer is uniformly present on the metal oxide particle surface and, accordingly, the resultant conductive polymer is also uniformly present on the metal oxide particle surface. However, a continuous film layer substantially or fully covering the surface of the metal oxide particle will prevent a cathodic reaction by contact of the metal oxide with an alkaline metal ion. Consequently, the "film layer" as used herein must have a structure which partially exposes the underlying metal oxide so as to ensure the contact of the metal oxide particle and the alkaline metal ion and not to prevent the cathodic reaction. In other words, in the cathode of the invention, a layer of an electrically conductive polymer material is present on the surface of metal oxide particle, the layer being formed in the form of, for example, a network or spots. A layer of conductive polymer material having such a structure can be obtained by discretionary selecting conditions for reaction, such as polymerization temperature and time, depending on the type of monomer used.

When such a conductive polymer material is formed on the surface of metal oxide particle, an anion, such as fluoride anion, may be dissolved, as an anion useful for drawing of electron from the conductive polymer, in a solution for the formation of the polymer, in order to enhance a dielectric constant of the conductive polymer. As a source of such a fluoride anion, for example, tetrafluoroborate, hexafluorophosphate, trifluorosulfonate, or a mixture thereof may be used. Also, when a polymeric solid electrolyte is formed by polymerization of a monomer for the polymeric solid electrolyte on an anode or cathode, the monomer for a polymer forming a matrix of the polymeric solid electrolyte may be allowed to coexist with a monomer for a conductive polymer in a solvent in which the monomer for the conductive polymer is dissolved, and a composite polymer made up of the conductive polymer and the polymer forming the matrix of the polymeric solid electrolyte is produced on the surface of a metal oxide particle, to thereby provide a good electrical contact with a layer of electrolyte which will be subsequently formed.

When a conductive polymer is formed also on the surface of metal oxide particle, a reaction for forming the conductive polymer on the surface of the metal oxide particle can be further promoted by previously causing an oxidizing agent, a substance having an oxidative effect, such as hydrogen peroxide or potassium persulfate, to come in contact with the metal oxide particle, to make the surface of the metal oxide particle a fully oxidized state.

In addition, to improve adhesion of a metal oxide to an electrically conductive film layer of a conductive polymer, the surface of the metal oxide may be treated by a compound, which is, in general, known as a coupling agent, and is represented by a formula such as $(R^1O)_3$—Si—$R^2$ or $R^1O$—Ti—$R^2{}_3$, wherein $R^1$ and $R^2$ denote an organic functional group, prior to formation of the conductive polymer.

The cathode can be made of a cathode material sheet formed by a mixture of the above-mentioned base materials and a material having a capability of binding the base materials, also known as a binder. As examples of materials having such a binding capability, the following can be enumerated: fluorinated polymers such as polytetrafluoroethylenes, fluorinated ethylene-propylene copolymers, and polyvinylidene fluorides, and thermoplastic polymers such as polymethyl acrylates, polymethyl methacrylates, and polyacrylonitriles. A mixture of two or more binders may be used. Alternatively, the above-mentioned conductive polymer material may be used as a binder for a metal oxide. A carbonaceous conductive material, such as acetylene black, carbon black, or a mixture thereof, can be also used by mixing with metal oxide powder having a surface provided with a conductive film layer.

A feature of the battery of the invention resides in that the conductive material for a cathode is a conductive polymer formed by polymerizing a monomer on the surface of metal oxide particle. The polymerization is carried out by a chemically oxidative polymerization using an oxidative effect which the metal oxide possesses, and the conductive polymer formed on the surface of the metal oxide particle by this reaction is insoluble in an organic solvent used in a polymeric solid electrode of the battery. The insolubility of the conductive polymer on the surface of the metal oxide particle in a solvent is advantageous for stabilization of the battery, particularly improvement of stability at an elevated temperature. Also, the conductive material forms a layer in the form of network or spots having a structure which partially exposes the underlying metal oxide so as to ensure the contact of the metal oxide particle and an alkaline metal ion and not to prevent a cathodic reaction, as described above.

Both the anode and the polymeric electrolyte in the battery of the invention may be made of materials generally used in a battery which uses a polymeric solid electrolyte and a redox reaction of alkali metal ion.

For the anode in the battery of the invention, by way of example, a material having larger reducing properties, namely a characteristic of being easily oxidized, is used. More specifically, an alkali metal, preferably lithium, or an alloy of an alkali metal and a metal of group II or III, such as a lithium-aluminum alloy, or the like can be used. Alternatively, a carbon material having a capability of occluding an alkali metal ion can be used.

The polymeric solid electrolyte in the battery of the invention is in the form of layer of a polymer matrix, the matrix being formed of a polymeric material, such as a polyethylene oxide-, polyacrylonitrile-, polyacrylate-, polymethacrylate-, or polysaccharide polymer-type material, a fluorinated polymer, or a mixture of these materials, and the matrix containing an inorganic salt including lithium as cation, such as lithium perchlorate, lithium tetrafluoroborate, lithium tetrafluorosulfonate or lithium hexafluorophosphate, or a mixture thereof, and an organic solvent, such as propylene carbonate, ethylene carbonate, diethyl carbonate, dimethyl carbonate, dimethoxyethane, or gamma-butyrolactone. The organic solvent may be a mixture of two or more solvents mixed in an appropriate ratio. Additionally, a curing agent may be used to polymerize the polymer matrix by light or heat to make it a solid.

Similarly, the collectors, external packaging material, and anode and cathode leads, which are also components of the battery of the invention, may be of those well known in the field of battery, and a further description is not required herein.

The battery of the invention can be manufactured by a method comprising a step of forming the electrically conductive material for the cathode by polymerizing a monomer on the surface of particle of the metal oxide constituting the cathode in a solution in which the monomer is dissolved.

Preferably, at least one monomer selected from the group consisting of pyrrole, aniline, thiophene, furan, and their derivatives is polymerized to provide the electrically conductive material.

Preferably, the electrically conductive material is formed so as to be present in the form of film layer on the surface of the metal oxide, the film layer having a structure which partially expose the underlying metal oxide.

Preferably, the metal oxide is selected from the group of oxides of cobalt, vanadium, manganese and nickel, and mixtures thereof.

Also preferably, the metal oxide is selected from the group consisting of lithium cobaltate, lithium vanadate, lithium manganate, lithium nickelate, and mixtures thereof.

Preferably, the cathode is formed of a mixture of the metal oxide, the electrically conductive material, and a binder therefor selected from the group of fluorinated polymers and thermoplastic polymers.

Preferably, the fluorinated polymer is selected from the group consisting of polytetrafluoroethylenes, fluorinated ethylene-propylene copolymers, and polyvinylidene fluorides.

Preferably, the thermoplastic polymer is selected from the group consisting of polymethyl acrylates, polymethyl methacrylates, and polyacrylonitriles.

Preferably, the cathode comprises a carbonaceous conductive material.

Preferably, the carbonaceous conductive material is selected from the group consisting of acetylene black, carbon black, and mixtures thereof.

Preferably, the polymeric solid electrolyte is in the form of layer of a polymer matrix, the matrix being formed of a polymeric material, and the matrix containing an inorganic salt including lithium as cation, and an organic solvent.

Preferably, the polymer matrix is formed of a material selected from the group consisting of polyethylene oxide-, polyacrylonitrile-, polyacrylate-, polymethacrylate-, and polysaccharide polymer-type materials, fluorinated polymers, and mixtures thereof.

Preferably, the inorganic salt is selected from the group consisting of lithium perchlorate, lithium tetrafluoroborate, lithium tetrafluorosulfonate, lithium hexafluorophosphate, and mixtures thereof.

Preferably, the organic solvent is selected from the group consisting of propylene carbonate, ethylene carbonate, diethyl carbonate, dimethyl carbonate, dimethoxyethane, gamma-butyrolactone, and mixtures thereof.

Preferably, the assembly includes leads for the anode and the cathode, the leads being formed of members different from the respective collectors for the anode and the cathode.

Preferably, a fluoride anion is present in the solution in which the monomer is dissolved during the formation of the electrically conductive material by polymerization.

Preferably, the fluoride anion is provided by a source of fluoride anion selected from the group consisting of tetrafluoroborate, hexafluorophosphate, trifluorosulfonate, and mixtures thereof.

Preferably, a monomer for the polymeric solid electrolyte is included in a solvent in which the monomer for the conductive material is dissolved, to thereby produce a composite polymer made up of the conductive polymer and a polymer forming a matrix of the polymeric solid electrolyte on the surface of the metal oxide particle.

Preferably, prior to the polymerization, the metal oxide is come in contact with an oxidizing agent.

Preferably, the oxidizing agent is selected from the group consisting of hydrogen peroxide and potassium persulfate.

Preferably, prior to the polymerization, the surface of the metal oxide is treated with a coupling agent.

EXAMPLES

The invention will now be further illustrated by the following examples. The invention is, of course, not limited to these examples.

Example 1

A cathode was made as follows. To 90 parts by weight of acetonitrile (solvent), were added 10 parts by weight of pyrrole and 5 parts by weight of lithium tetrafluoroborate. After the mixture was uniformly mixed, 50 parts by weight of lithium cobaltate powder having an average particle diameter of 8 micrometers was added, and the resultant mixture was left to stand with gentle agitation at room temperature for 10 minutes, to thereby polymerize the pyrrole. Subsequently, the lithium cobaltate was separated by filtration, was washed by acetonitrile, and was then dried at 80° C. for 10 minutes. To 100 parts by weight of the resultant powder, was added 3 parts by weight of acetylene black, and after the materials were mixed by a mill, the mixture was kneaded with 50 parts by weight of 10% solution of polyvinylidene fluoride in N-methylpyrrolidone. The resultant mixture was then spread in a thickness of 150 micrometers on a cathode collector (30 micrometers thick aluminum foil), and was then dried at 150° C. for 30 minutes to make a cathode foil.

1 part by weight of 10% solution of polyvinylidene fluoride in N-methylpyrrolidone was mixed with 1 part by weight of graphite-type carbon, and the mixture was kneaded, was spread in a thickness of 100 micrometers on an anode collector (30 micrometers thick copper foil), was then dried at 150° C. for 30 minutes to make an anode foil.

100 parts by weight of a 10:1 mixture of polyethylene oxide having one end acryl-modified (90G manufactured by Kyoei-Sha Kagaku) and polyethylene oxide having both ends acryl-modified (9EG manufactured by Kyoei-Sha Kagaku) and 100 parts by weight of propylene carbonate containing 1M of lithium tetrafluoroborate were mixed, and 1 part by weight of benzoyl peroxide as an initiator was then added to the resultant mixture to prepare a reaction solution for forming a polymeric solid electrolyte.

The reaction solution for polymeric solid electrolyte was cast on the previously made anode foil to form a film in 100 micrometers thick, and the film was then irradiated with ultraviolet light from an extra-high pressure mercury lamp (1 mW/cm$^2$) for 1 minute for polymerization, to make a half cell provided with a gel-like solid electrolyte film. Subsequently, to the side of the polymeric solid electrolyte of the half cell, was applied and pressed the previously made cathode foil, to thereby provide a battery of Example 1. This battery had a thickness of 0.5 millimeters, a width of 48 millimeters, a length of 56 millimeters, and a battery capacity of 40 mAh. The battery was produced under an inert atmosphere, and accordingly, the produced battery was subjected to measurements of properties without encapsulation by an encapsulating material. Voltage between the anode and the cathode was obtained through the corresponding respective collectors.

Example 2

A battery of Example 2 was obtained in a similar way to that of Example 1, except that lithium tetrafluoroborate used as a lithium salt in the formation of the cathode and polymeric solid electrolyte of Example 1 was replaced with lithium hexafluorophosphate.

Example 3

A battery of Example 3 was obtained in a similar way to that in Example 1, except that aniline was used as a monomer for a conductive polymer for a cathode.

Example 4

A battery of Example 4 was obtained in a similar way to that in Example 1, except that lithium cobaltate as a metal oxide for a cathode was treated by a solution prepared by adding 5 parts by weight of 30% aqueous hydrogen peroxide to 100 parts by weight of propylene carbonate, for 1 minute.

Example 5

A battery of Example 5 was obtained in a similar way to that in Example 1, except that lithium cobaltate as a metal oxide for a cathode was treated, prior to the addition to the mixture of acetonitrile, pyrrole and lithium tetrafluoroborate, by a solution obtained by adding 5 parts by weight of gamma-glycidoxypropyltriethoxysilane to 100 parts by weight of toluene, for 5 minutes.

Example 6

To 900 parts by weight of acetonitrile, were added 100 parts by weight of pyrrole, 50 parts by weight of lithium tetrafluoroborate, and 50 parts by weight of polyethylene oxide having both ends acryl-modified (9EG manufactured by Kyoei-Sha Kagaku). After the mixture was uniformly mixed, 500 parts by weight of lithium cobaltate and 1 part by weight of 2,2'-azobisisobutyronitrile as a reaction initiator were added, and the mixture was then gently stirred under an argon gas flow at 60° C. for 1 hour. Subsequently, the lithium cobaltate provided with a polymeric conductive film layer on its surface was separated by filtration, was washed by acetonitrile, and was then dried at 80° C. for 10 minutes. To 100 parts by weight of the resultant powder, was added 3 parts by weight of acetylene black, and after the materials were mixed by a mill, the mixture was kneaded with 50 parts by weight of 10% solution of polyvinylidene fluoride in N-methylpyrrolidone. The resultant mixture was then spread in a thickness of 150 micrometers on a cathode collector (30 micrometers thick aluminum foil), and was then dried at 150° C. for 30 minutes to prepare a cathode foil.

The cathode foil thus obtained, and the same anode foil and reaction solution for polymeric solid electrolyte as those used in Example 1 were used, and a battery of Example 6 was obtained in a similar way to that in Example 1.

Example 7

To 800 parts by weight of propylene carbonate, were added 100 parts by weight of aniline, 50 parts by weight of lithium hexafluorophosphate, 50 parts by weight of polyethylene oxide having one end acryl-modified (90G manufactured by Kyoei-Sha Kagaku), and 50 parts by weight of polyacrylonitrile (manufactured by Aldrich). After the mixture was uniformly mixed, 500 parts by weight of lithium cobaltate and 1 part by weight of 2,2'-azobisisobutyronitrile as a reaction initiator were added, and the mixture was then gently stirred under an argon gas flow at 90° C. for 1 hour. Subsequently, the lithium cobaltate provided with a polymeric conductive film layer on its surface was separated by filtration, was washed by acetonitrile, and was then dried at 80° C. for 10 minutes. To 100 parts by weight of the resultant powder, was added 3 parts by weight of acetylene black, and after the materials were mixed by a mill, the mixture was kneaded with 50 parts by weight of 10% solution of polyvinylidene fluoride in N-methylpyrrolidone. The resultant mixture was then spread in a thickness of 150 micrometers on a cathode collector (aluminum foil in 30 micrometers thick), and was then dried at 150° C. for 30 minutes to prepare a cathode foil.

The cathode foil thus obtained, an anode of carbon of graphite type, and the same reaction solution for polymeric solid electrolyte as that used in Example 1 were used, and a battery of Example 7 was obtained in a similar way to that in Example 1.

Comparative Example

A battery of Comparative Example was obtained in a similar way to that in Example 1, except that lithium cobaltate which was not provided with a conductive film layer of polypyrrole on its surface was used.

The batteries of Examples 1 to 7 as well as Comparative Example were secondary batteries having an open-circuit voltage of 3.6 to 3.7 volts. These batteries were subjected to discharge tests at current rates corresponding to 0.2C and 2C at room temperature, to evaluate their properties. The batteries were charged at 0.2C. Results are summarized in Table 1. The ratios of discharges at 2C and 0.2C (2C/0.2C ratio) reveal that the batteries of Examples 1 to 7 have improved properties at high rate discharge compared with the battery of the Comparative Example. Also, the high temperature cycle lives at a current rate of 0.2C measured at 45° C. (ratios of capacities at the first cycle and the 50th cycle (C50/C1 ratio)) reveals that the batteries of Examples 1 to 7 are improved compared with the battery of the Comparative Example.

TABLE 1

Properties of Batteries

| Examples | Capacity, mAh Dis. at 0.2C | dis. at 2C | 2C/0.2C | Capacity, mAh 1st Cycle | 50th Cycle | C50/C1 |
| --- | --- | --- | --- | --- | --- | --- |
| 1 | 39 | 36 | 0.92 | 39 | 35 | 0.90 |
| 2 | 39 | 37 | 0.95 | 39 | 36 | 0.92 |
| 3 | 39 | 38 | 0.97 | 39 | 37 | 0.95 |
| 4 | 39 | 37 | 0.95 | 39 | 37 | 0.95 |
| 5 | 39 | 37 | 0.95 | 39 | 38 | 0.97 |
| 6 | 39 | 37 | 0.95 | 39 | 35 | 0.90 |
| 7 | 39 | 38 | 0.97 | 39 | 35 | 0.90 |
| Comparative | 39 | 23 | 0.59 | 39 | 15 | 0.38 |

Thus, the invention makes it possible that a cathode having good electrical conductivity is used in a battery using a polymeric solid electrolyte as an electolyte, by forming, on the surface of metal oxide particle as a cathode active material, a film layer of an electrically conductive polymer which is obtained by oxidative polymerization of a monomer on that surface and is insoluble in a solvent used in the battery. Consequently, it becomes possible that the battery of the invention has an improved properties at high rate of discharge, and suffers from less deterioration at an elevated temperature.

What is claimed is:

1. A battery comprising an assembly of a cathode consisting mainly of a metal oxide enabling intercalation of an alkali metal ion and an electrically conductive material, a cathode collector in contact with the cathode, an anode of a material selected from the group consisting of an alkali metal, an alloy of an alkali metal and a metal of group II or III, and a carbon material capable of occluding alkali metal ion, an anode collector in contact with the anode, and a polymeric solid electrolyte interposed between the anode and the cathode, and an external packaging material sealing the assembly, wherein the electrically conductive material for the cathode is an electrically conductive polymer having been formed by chemically polymerizing a monomer on the surface of particles of the metal oxide constituting the cathode so as to partially expose the surface of the metal oxide particle.

2. The battery of claim 1, wherein the electrically conductive polymer is a polymer obtained by polymerization of at least one monomer selected from the group consisting of pyrrole, aniline, thiophene, and furan.

3. The battery of claim 1, wherein the electrically conductive polymer is present in the form of film layer on the surface of the metal oxide, the film layer of the polymer having a structure which partially exposes the underlying metal oxide.

4. The battery of claim 1, wherein the metal oxide is selected from the group of oxides of cobalt, vanadium, manganese and nickel, and mixtures thereof.

5. The battery of claim 1, wherein the metal oxide is selected from the group consisting of lithium cobaltate, lithium vanadate, lithium manganate, lithium nickelate, and mixtures thereof.

6. The battery of claim 1, wherein the cathode comprises a binder selected from the group of fluorinated polymers and thermoplastic polymers.

7. The battery of claim 6, wherein the fluorinated polymer is selected from the group consisting of polytetrafluoroethylenes, fluorinated ethylene-propylene copolymers, and polyvinylidene fluorides.

8. The battery of claim 6, wherein the thermoplastic polymer is selected from the group consisting of polymethyl acrylates, polymethyl methacrylates, and polyacrylonitriles.

9. The battery of claim 1, wherein the cathode comprises a carbonaceous conductive material.

10. The battery of claim 9, wherein the carbonaceous conductive material is selected from the group consisting of acetylene black, carbon black, and mixtures thereof.

11. The battery of claim 1, wherein the polymeric solid electrolyte is in the form of layer of a polymer matrix, the matrix being formed of a polymeric material, and the matrix containing an inorganic salt including lithium as cation, and an organic solvent.

12. The battery of claim 11, wherein the polymer matrix is formed of a material selected from the group consisting of polyethylene oxide-, polyacrylonitrile-, polyacrylate-, polymethacrylate-, and polysaccharide polymer materials, fluorinated polymers, and mixtures thereof.

13. The battery of claim 11, wherein the inorganic salt is selected from the group consisting of lithium perchlorate, lithium tetrafluoroborate, lithium tetrafluorosulfonate, lithium hexafluorophosphate, and mixtures thereof.

14. The battery of claim 11, wherein the organic solvent is selected from the group consisting of propylene carbonate, ethylene carbonate, diethyl carbonate, dimethyl carbonate, dimethoxyethane, gamma-butyrolactone, and mixtures thereof.

15. The battery of claim 1, wherein the assembly includes leads for the anode and the cathode, the leads being formed of members different from the respective collectors for the anode and the cathode.

16. A method of manufacturing a battery comprising preparing an assembly of a cathode consisting mainly of a metal oxide enabling intercalation of an alkali metal ion and an electrically conductive material, a cathode collector in contact with the cathode, an anode of a material selected from the group consisting of an alkali metal, an alloy of an alkali metal and a metal of group II or III, and a carbon material capable of occluding alkali metal ion, an anode collector in contact with the anode, and a polymeric solid electrolyte interposed between the anode and the cathode, and sealing the assembly by an external packaging material, the method comprising a step of forming the electrically conductive material for the cathode by polymerizing a monomer on the surface of particle of the metal oxide constituting the cathode in a solution in which the monomer is dissolved.

17. The method of claim 16, wherein at least one monomer selected from the group consisting of pyrrole, aniline, thiophene, and furan is polymerized to provide the electrically conductive material.

18. The method of claim 16, wherein the cathode is formed of a mixture of the metal oxide, the electrically conductive material, and a binder therefor selected from the group of fluorinated polymers and thermoplastic polymers.

19. The method of claim 16, wherein the polymeric solid electrolyte is in the form of layer of a polymer matrix, the matrix being formed of a polymeric material, and the matrix containing an inorganic salt including lithium as cation, and an organic solvent.

20. The method of claim 16, wherein a monomer for the polymeric solid electrolyte is included in a solvent in which the monomer for the conductive material is dissolved, to thereby produce a composite polymer made up of the conductive polymer and a polymer forming a matrix of the polymeric solid electrolyte on the surface of the metal oxide particle.

* * * * *